No. 682,382. Patented Sept. 10, 1901.
J. W. GRAY.
LIQUID BALANCE.
(Application filed Mar. 18, 1898.)
(No Model.)

WITNESSES
T. W. Buckhead
Alix. Scott

INVENTOR
John W. Gray
by Dewey Strong & Co.,
his Attorneys

UNITED STATES PATENT OFFICE.

JOHN W. GRAY, OF OAKLAND, CALIFORNIA.

LIQUID-BALANCE.

SPECIFICATION forming part of Letters Patent No. 682,382, dated September 10, 1901.

Application filed March 18, 1898. Serial No. 674,319. (No model.)

*To all whom it may concern:*

Be it known that I, JOHN W. GRAY, a citizen of the United States, residing at Oakland, in the county of Alameda, State of California, have invented certain new and useful Improvements in Liquid-Balances; and I hereby declare the following to be a full, clear, and exact description of the same.

My invention relates to an instrument specially designed to determine weights, volumes, densities, &c., of both liquids and solids, and generally such information as may be derived from the various data the instrument will furnish.

It consists of the construction and arrangement of parts constituting the instrument I will hereinafter describe and claim.

Figure 1:
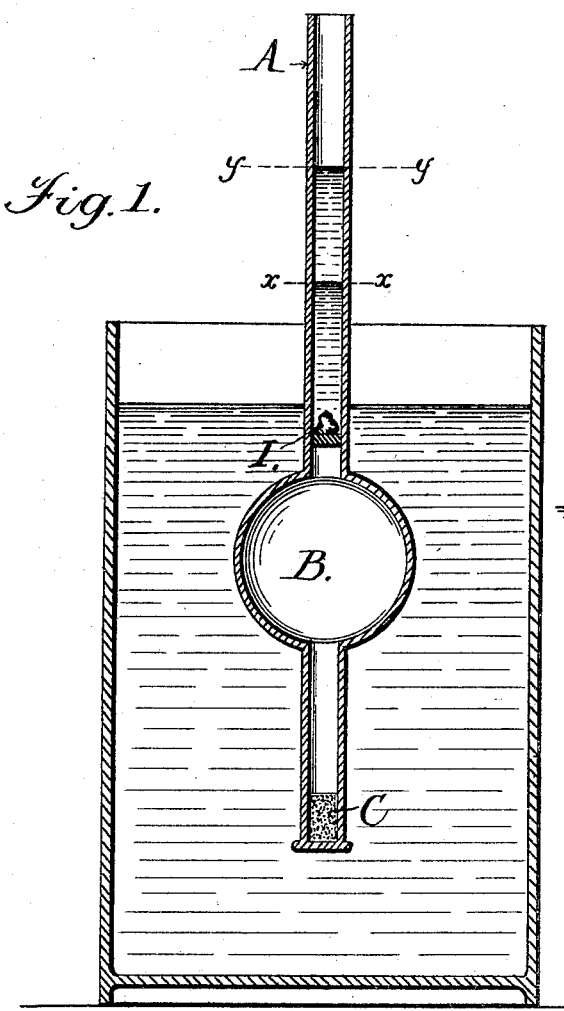
Figure 2:
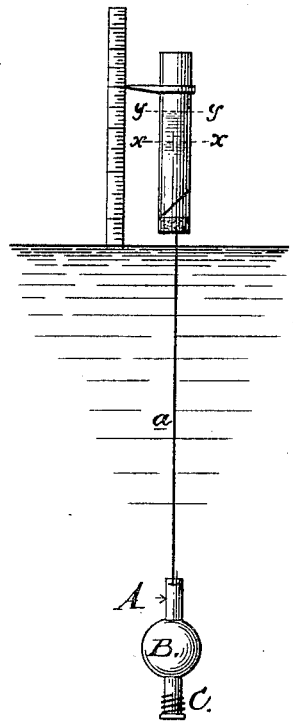

Figure 1 represents a sectional view of the device. Fig. 2 shows the arrangement for determining the dimensions and weights of small objects.

In the accompanying drawings, A represents a hollow tube provided with a bulb B to buoy it up and an adjustable weight C to make it float in a vertical position. As shown in Fig. 1, the tube is specially designed to receive a liquid adapted to rise in the tube when the object to be weighed is placed within the latter. In this form of the device the outer and inner diameter of tube may be accurately determined, the tube extending upwardly from the float and having a sealed or closed bottom, as shown at I. The instrument thus shown is then placed in the liquid of a suitable tank or vessel, the specific gravity of which liquid is known, and the point at which the device floats is noted upon an appropriate scale. Water or other liquid, the specific gravity of which is known, is placed in the tube until its surface stands at a noted point, as $x$. The object is then placed in the tube, and the whole instrument will sink in the liquid in the tank to a point which can be noted upon an exterior scale. The liquid in the tube at the same time rises on account of the displacement by the object placed in it to a point on the inner scale, which may be here noted as $y$. The exterior scale shows the depth to which the whole instrument sinks, gives the weight of the object and the rise of the liquid on the inside by the interior scale, gives the volume of the liquid equal to the volume of the object weighed, and therefore its lost weight in the liquid in which it is immersed. If the liquid throughout be distilled water at standard temperature, the depth to which the whole instrument sinks gives the weight of the object and the rise of water in the tube gives its loss of weight in water. Its specific gravity is therefore determined by dividing the weight by the loss of water. Many sizes and shapes of this form of the instrument can be made according to the use for which it is desired and accurately needed. The diameter of the main stem of the instrument and the form of the instrument generally can be so varied as to give good results in all cases.

For the purpose of determining the weight, volume, and specific gravity of small objects the device illustrated in Fig. 2 is very useful. In this form the tube A is made small, as is also the holder of the upper tube J, which is fixed upon the top of the wire or stem $a$. This increases the distance through which the whole instrument sinks and the water in the tube rises, and thus enables a small weight and volume of the object to be readily obtained. It will be observed that in the form of instrument here described the weight and volume or loss of weight in water, and therefore the specific gravity of the object, are all determined at once and in the same operation, as the distance to which the float sinks and the rise of the liquid within the tube into which the object has been placed will give all the data for determining the above facts. With this construction water may be poured into the upper tube J until it stands, for instance, at $x$. The instrument is then placed in the liquid in which it is to float and the distance from the top of the instrument to a fixed surface is measured on a scale. Then the object whose volume is to be determined, which in the present case is illustrated as a short length of fine wire, is dropped into the upper tube. This will cause the water to rise to some point, as $y$, while the instrument sinks in the liquid in which it floats. The distance from the top of the instrument to a fixed surface is again taken by scale, and the difference of the two readings gives data to determine the weight of the wire. Water is now taken from the upper tube until its surface falls again to $x$, the wire still remaining within the tube. The distance from the top of the instrument to the fixed point is again measured by the scale, and this reading subtracted from the first reading of the scale gives the weight of a volume of water equal to the volume of the wire. This consequently gives the volume of the wire.

Having thus described my invention, what I claim as new, and desire to secure by Letters Patent, is—

An instrument for determining weights, volumes, &c., consisting of a hollow tube to receive a liquid adapted to rise in the tube when the object to be weighed is placed within the latter, means for causing the tube to float erect in a liquid, and means for determining depths of flotation and rise of liquid within the instrument.

In witness whereof I have hereunto set my hand.

JOHN W. GRAY.

Witnesses:
S. H. NOURSE,
JESSIE C. BRODIE.